United States Patent

Young

[19]

[11] Patent Number: 5,833,518
[45] Date of Patent: Nov. 10, 1998

[54] METHOD FOR FORMING A WAVY FACE RING

[75] Inventor: Lionel A. Young, Murrieta, Calif.

[73] Assignee: Flowserve Management Company, Irving, Tex.

[21] Appl. No.: 691,496

[22] Filed: Aug. 2, 1996

[51] Int. Cl.[6] .................................................. B24B 1/00
[52] U.S. Cl. .............................. 451/53; 451/55; 451/63
[58] Field of Search .................................. 29/888.3, 447, 29/507, 508, 515, 516, 522.1, 523; 451/53, 54, 55, 63, 254, 258, 290, 385, 460, 913; 277/648, 400, 403

[56] References Cited

U.S. PATENT DOCUMENTS

| | | | |
|---|---|---|---|
| 3,693,301 | 9/1972 | Lemaltre | 451/55 |
| 3,744,805 | 7/1973 | Heinrich . | |
| 3,751,784 | 8/1973 | Packard | 451/55 X |
| 3,862,480 | 1/1975 | Packard et al. | 451/55 X |
| 3,970,320 | 7/1976 | Wiese . | |
| 4,212,475 | 7/1980 | Sedy . | |
| 4,836,561 | 6/1989 | Lebeck et al. . | |
| 4,842,286 | 6/1989 | Heilala . | |
| 4,887,395 | 12/1989 | Lebeck . | |

FOREIGN PATENT DOCUMENTS 2 197 040   5/1988   United Kingdom .

OTHER PUBLICATIONS

IBM Technical Disclosur Bulletin, Process For Obtaining A Convex Surface, R. Brunner, vol. I No. 1, Jun. 1958.
Hydrodynamic Lubrication in Wavy Contacting Face Seals—A Two dimensional Model; 1980.
Design of an Optimum Moving Wave and Tilt Mechanical Face Steal for Liquid Applications Apr. 1981.
The Design and Testing of Moving Wave Mechanical Face Seals Under Variable Operating Conditions in Water; Apr. 9, 1985.
Development of a Noncontacting Seal for Gas/Liquid Applications Using Wavy Face Technology GSL Gas Sealing Technology; 1995.

*Primary Examiner*—Timothy V. Eley
*Attorney, Agent, or Firm*—Pretty, Schroeder & Poplawski

[57] ABSTRACT

A wavy face ring having a smooth face and a method of manufacturing this wavy face ring. In particular, the method includes providing a ring blank having a face surface and a peripheral surface and applying a predetermined force to the peripheral surface of the ring. This force deforms the face surface of the ring blank into a first deformation pattern. The face surface of the ring blank is then treated while the force is being applied to the peripheral surface of the ring blank. Finally, the force is removed from the peripheral surface of the ring blank to allow the face surface of the ring to relax and assume a second deformation pattern. A wavy face ring assembly is also provided that includes opposing rings mounted about a rotating shaft. One of the rings is stationary with respect to the other and one of rings has a wavy face treated by a lapping machine. The ring can be a seal ring or a thrust ring.

21 Claims, 10 Drawing Sheets

METHOD FOR FORMING A WAVY FACE RING

BACKGROUND OF THE INVENTION

The invention relates generally to mechanical seals, and, more particularly, to a mechanical seal having a wavy face seal ring for operation in liquid and gas environments.

It has long been popular in industry to use mechanical seals to resist leaks within a variety of machines having rotating parts, including pumps, compressors and the like. More recently, mechanical seals with wavy-shaped faces have been used in these machines to minimize leakage while providing both static and dynamic load support. Examples of wavy face seal rings are described in U.S. Pat. Nos. 4,836,561 and 4,887,395 to Lebeck et al., both of which are incorporated herein by reference.

Figure 1:
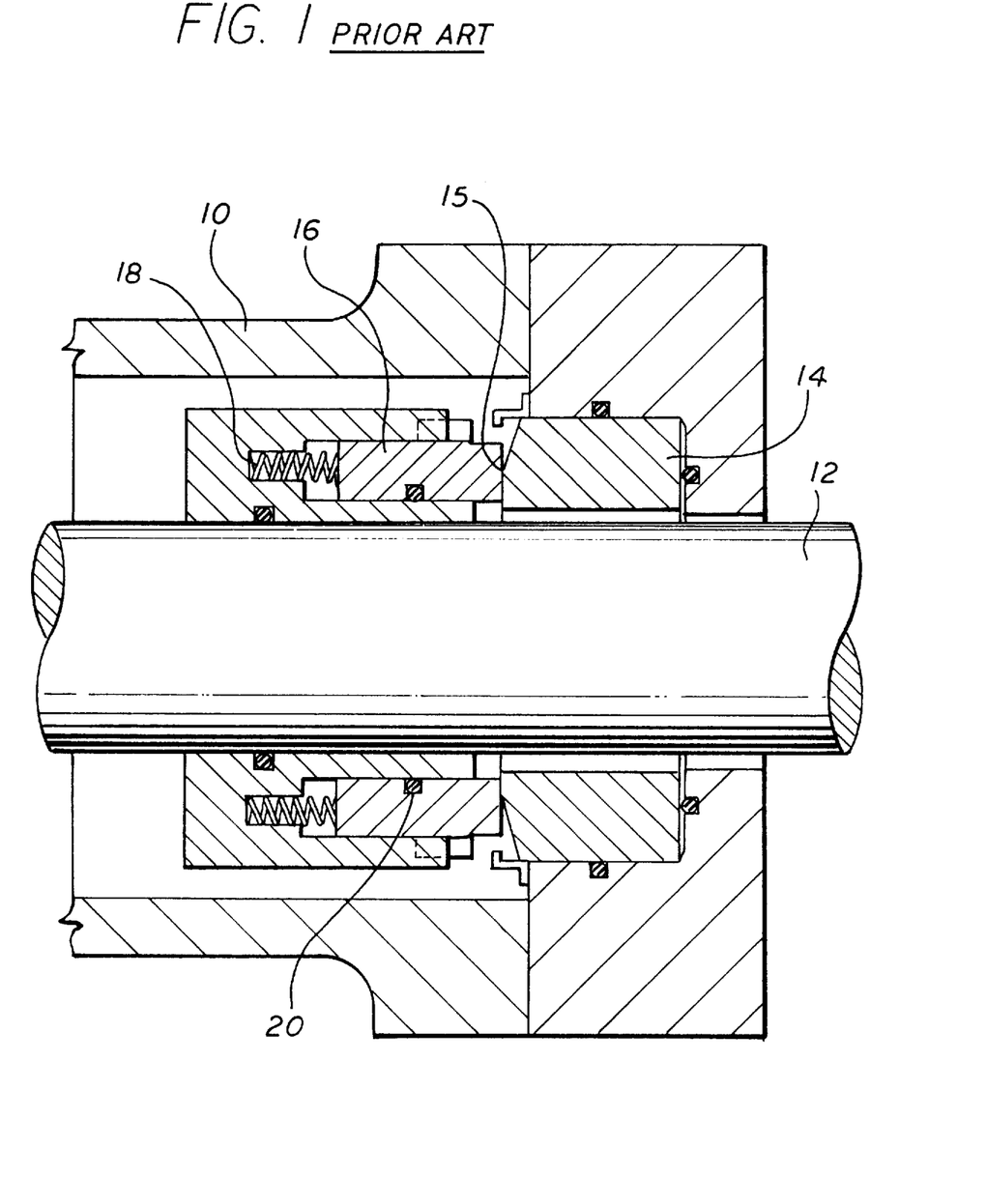
FIG. 1 is a cross sectional assembly view of a portion of a pump including a prior art wavy face mechanical seal.

FIG. 1 illustrates a cross sectional assembly view of a pump incorporating a conventional wavy face mechanical seal. Briefly, the pump includes a housing 10, a rotating shaft 12, a wavy face seal mating ring 14, a flat-faced primary ring 16, springs 18 and a secondary seal 20, such as an O-ring. The rotating shaft extends through the primary ring and the mating ring. The primary ring rotates with the shaft while the mating ring is fixed relative to the housing. The springs urge the primary ring toward the mating ring to form the seal. In particular, the mating ring 14 and the primary ring 16 serve the primary function of sealing a sliding interface 15 between the two rings 14 and 16 by maintaining either a close gap or contact between the faces of the two rings 14 and 16 so as to limit the amount of leakage flow.

Figure 2:
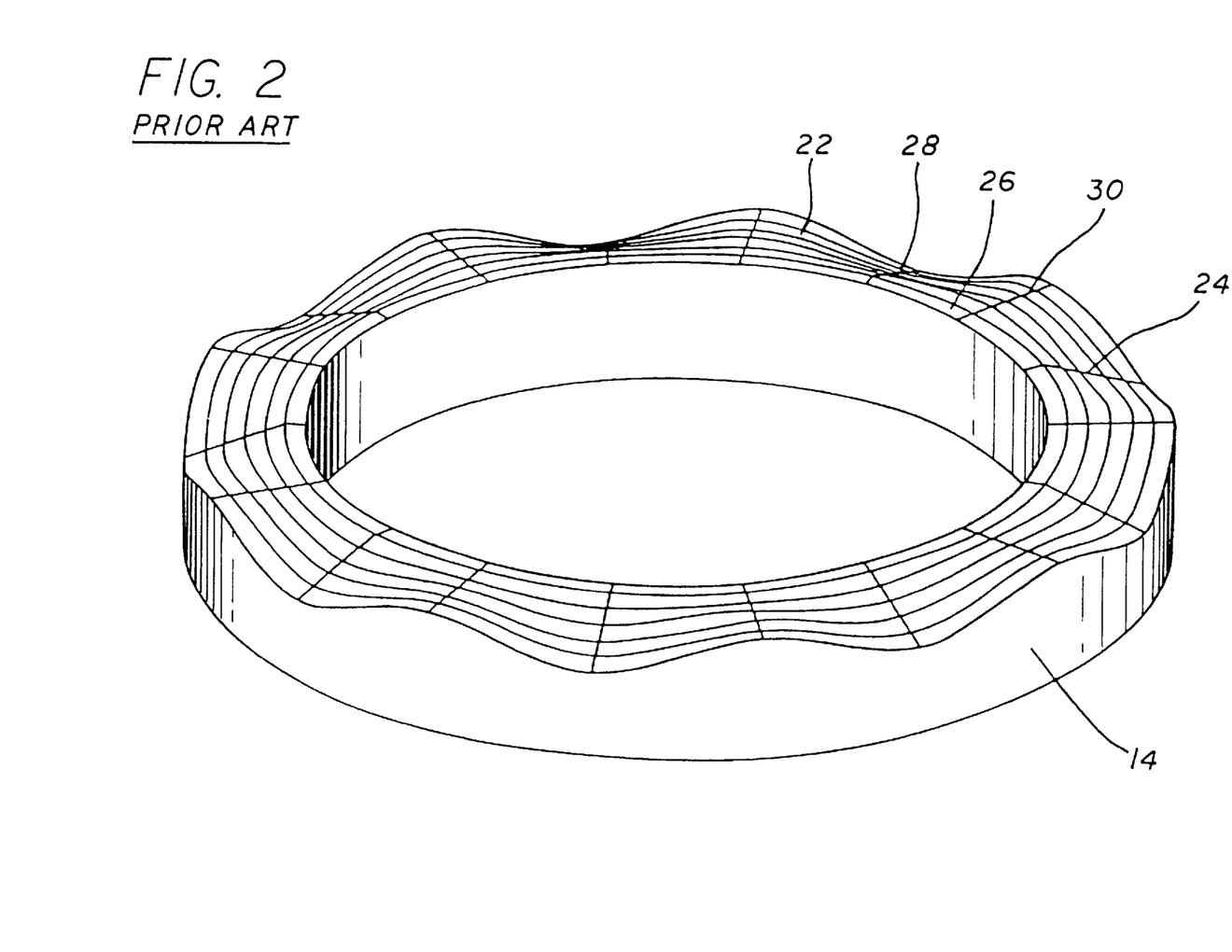
FIG. 2 is a perspective view of the wavy face seal ring of FIG. 1.

The wavy face mating ring 14 is shown in exaggerated detail in FIG. 2. The wavy face of the ring includes numerous circumferential waves 22. Each pair of waves is separated by a radially-tilted region 24. The face of the mating ring further includes an elevated and generally flat circumferential dam 26 located on its inner periphery. The waves have low spots 28 and high spots 30 that are most apparent at the outer diameter of the mating ring. Each low spot coincides with an associated low spot of a tilted region. The high spots of the waves are generally aligned in height with the dam and thus the amplitude of the waves diminishes to zero as one moves radially inward toward the dam. The waves and tilted regions tend to enhance lubrication between the mating ring and the primary ring, while the dam abuts the surface of the primary ring to minimize leakage.

Figure 3:
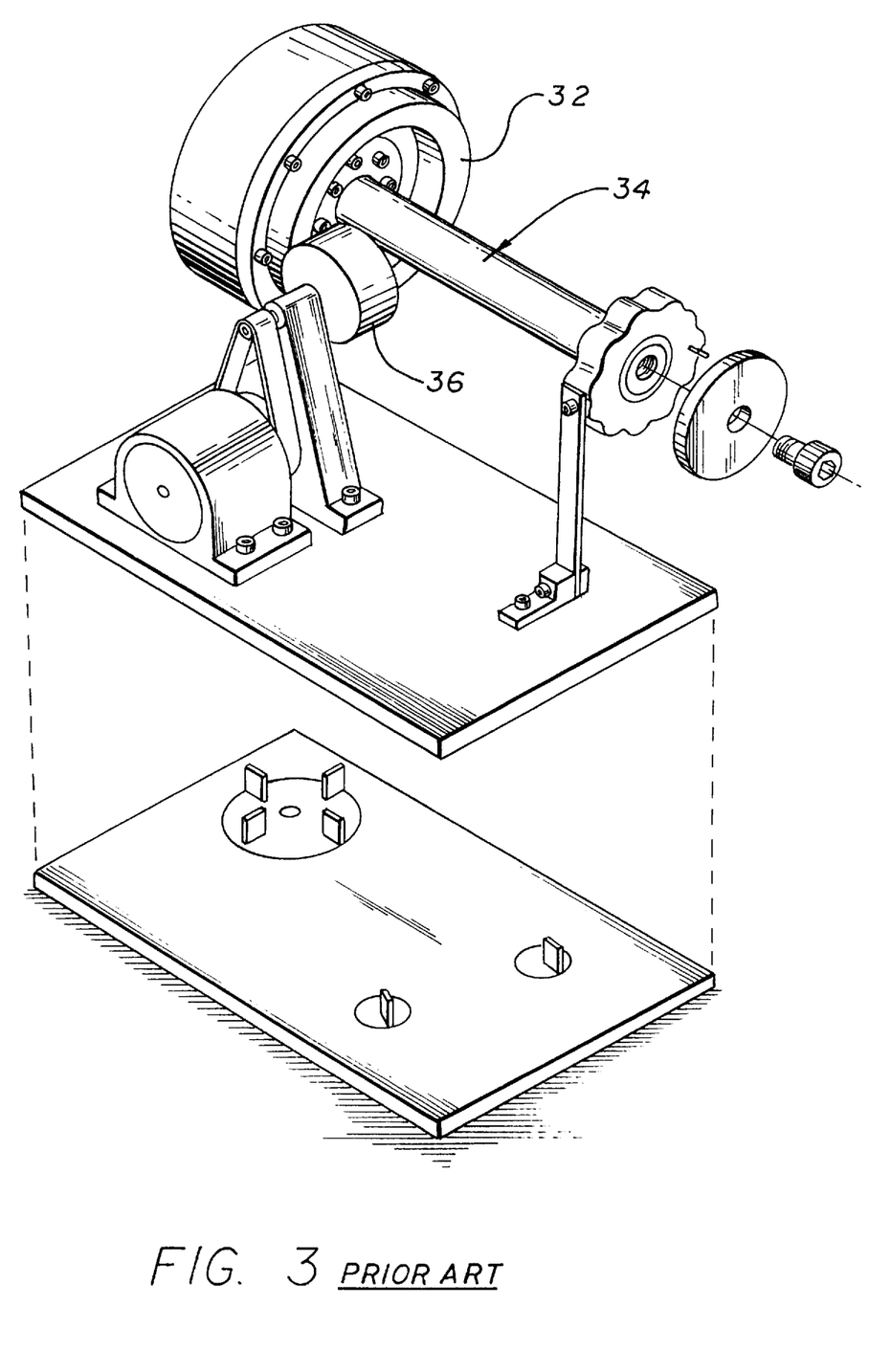
FIG. 3 is a perspective view of a grinding machine for manufacturing the wavy face seal ring of FIG. 1.

The surface finish of the wavy face seal ring is particularly important in gas seal applications. In particular, a wavy face seal ring with a very smooth surface provides less leakage and greater load support. The shape of the wavy face seal ring described above is formed by grinding hard ring material 32 with a grinding machine 34 having a grinding wheel 36, as illustrated in FIG. 3. The grinding machine and process is described in full detail in the above mentioned patents. While this machine is generally acceptable, it produces a surface finish of 8 to 10 $\mu$in $R_a$ ($R_a$ connotes roughness average) or greater. The grinding process is also very time consuming and expensive.

One machine capable of manufacturing items with very smooth surface finishes is a lapping machine. However, commercially available lapping machines are limited in that they are only capable of producing very smooth flat surfaces, i.e., lapped surfaces. Thus, a lapping machine cannot directly make a wavy face seal ring with a very low surface roughness.

It should therefore be appreciated that there is a need for a wavy face ring having a smooth lapped face and that there is a need for a method of manufacturing a wavy face ring with such a smooth lapped face. The present invention fulfills this need.

SUMMARY OF THE INVENTION

The present invention provides a wavy face ring having a smooth lapped face and a method of manufacturing a wavy face ring with such a smooth lapped face. In particular, the invention relates to a method of manufacturing a wavy face ring includes providing a ring blank having a face surface and a peripheral surface and applying a predetermined force to the peripheral surface of the ring. This force deforms the face surface of the ring blank into a first deformation pattern. The face surface of the ring blank is then treated while the force is being applied to the peripheral surface of the ring blank. Finally, the force is removed from the peripheral surface of the ring to allow the face surface of the ring to relax and assume a second deformation pattern. The invention also provides for an assembly that incorporates a wavy face ring forming a sliding interface with another ring mounted about a rotating shaft.

In more detailed aspects of the invention, the second deformation pattern is generally a mirror image of the first deformation pattern and the treating includes lapping or surface grinding the face surface of the ring blank. In yet another more detailed aspect of the invention, the applying of the predetermined force to the peripheral surface of the ring includes providing a rigid band of a predetermined size and creating a predetermined temperature differential between the band and the ring. The peripheral surface of the ring is then positioned for engagement with the band while maintaining the temperature differential. The temperature differential is then decreased to cause contact between the band and the peripheral surface of the ring to apply a force to the edge surface of the seal ring. In yet other more detailed aspects of the invention, the ring is a seal ring or a thrust ring.

A primary advantage of the invention is that it advantageously provides for the manufacture of wavy face rings with surface finishes that are smoother than those previously available. Thus, the preferred wavy face seal rings made by the method of the invention have improved leakage characteristics and greater load support over those that have previously been available. The method can also advantageously allow the manufacture of wavy surfaces by precision machinery capable of producing only flat surfaces, preferably including a lapping machine or a surface grinding machine.

Other features and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

The following drawings illustrate the preferred embodiment of the invention. In such drawings.

DESCRIPTION OF THE PREFERRED EMBODIMENT

With reference now to the drawings, and particularly FIGS. 4–7, the present invention is preferably embodied in a wavy face seal ring, generally referred to by the reference numeral 100. In the preferred embodiment, the wavy face seal ring is associated with a mechanical seal 50 mounted to a shaft 52 within a housing 54. The wavy face seal ring 100 is mounted to the housing and a positioning pin 56 prevents rotation of the wavy face seal ring relative to the housing. A retaining ring 58, such as a non-sealing O-ring or a garter spring, locates the wavy face seal ring relative to the housing and a second O-ring 60 seals the back side of the wavy face seal ring relative to the housing.

Figure 4:
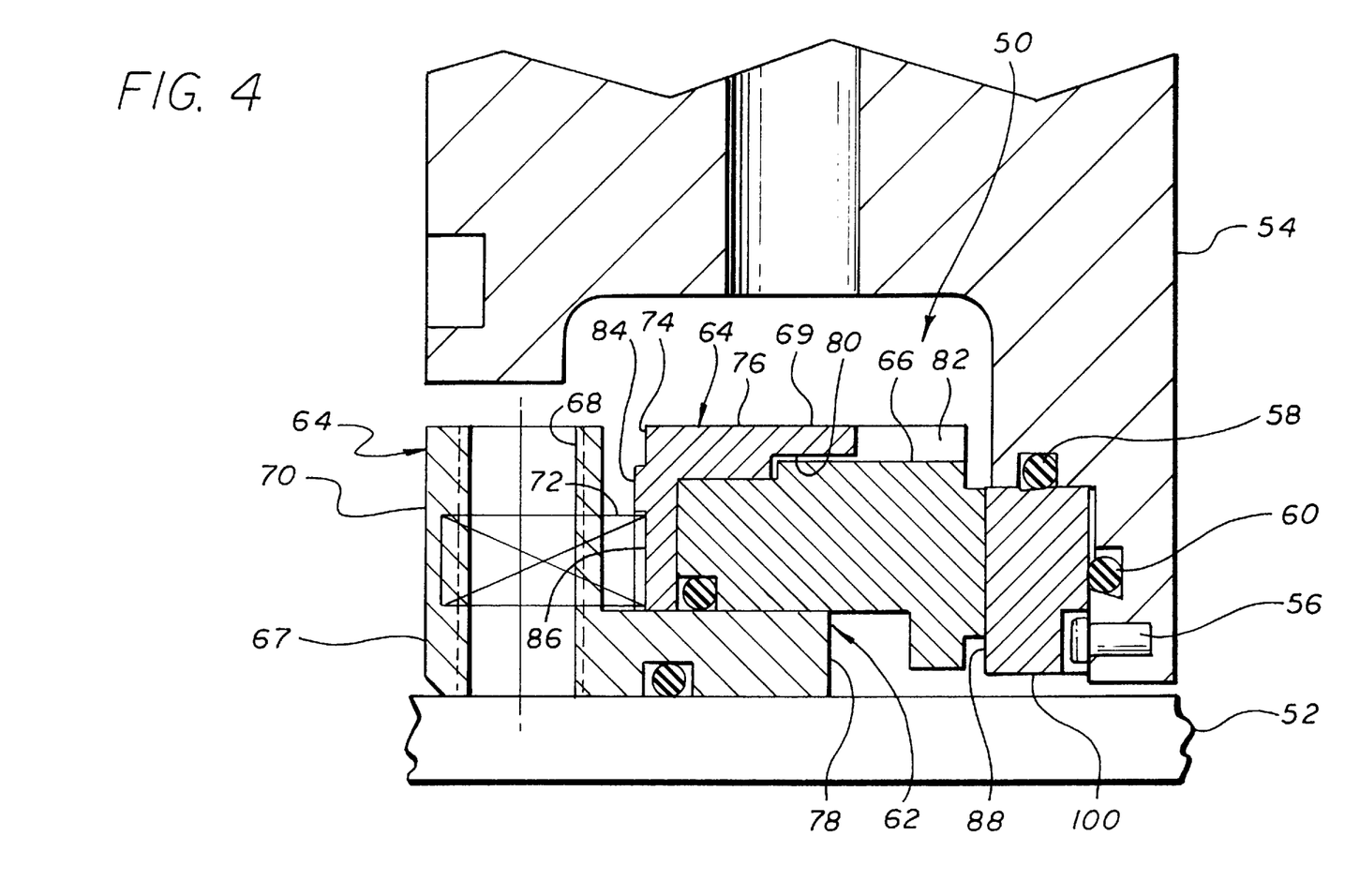
FIG. 4 is a cross sectional assembly view of a portion of a pump having a wavy face mechanical seal according to the invention.

The mechanical seal 50 also includes a rotary face seal ring assembly 62 having a rotary face seal ring holder 64 and a rotary face seal ring 66. The holder 64 preferably includes two parts: an L-shaped spring holder sleeve 67 and a seal ring drive 69. The spring holder sleeve 67 is fixed to the shaft by set screws (not shown) located in bores 68. A radially extending leg 70 of the spring holder sleeve includes a plurality of axially extending cavities for receiving springs 72. The seal ring drive 69 has a radially extending leg 74 and an axially extending leg 76, the latter of which is radially spaced from an axially extending leg 78 of the spring holder sleeve 67 to form a cavity 80 to receive the rotary face seal ring 66.

The axially extending leg 76 of the seal ring drive includes a plurality of axially extending tabs that engage axial grooves 82 on the rotary face seal ring 66 for driving engagement. The radially extending leg 74 of the seal ring drive includes an annular protrusion 84 defining a plurality of cavities 86 for receiving the other ends of the spring 72. Although not shown, a radially outer end of the protrusion 84 may be extended axially toward the spring holder in a plurality of locations to form extensions that are received in cavities of the spring holder sleeve 67 for driving engagement therebetween.

The wavy face seal ring and the rotary face seal ring serve a primary function of sealing a sliding interface 88 between the two rings by maintaining either a close gap or contact between the faces of the two rings so as to limit the amount of leakage flow. It will be appreciated that while the wavy shape seal ring is located on the stationary side of the mechanical seal, it could also be utilized for the rotary seal face ring.

The wavy face seal ring 100 has a smooth upper surface 102 manufactured by a process that utilizes a thermally expandable shrink band 104 and a lapping machine (not shown). Preferably, the smooth surface of this wavy face seal ring has a roughness of about 4 $\mu$in $R_a$ or less and more preferably about 2 $\mu$in $R_a$ which yields improved leakage characteristics and greater load support.

Figure 5:
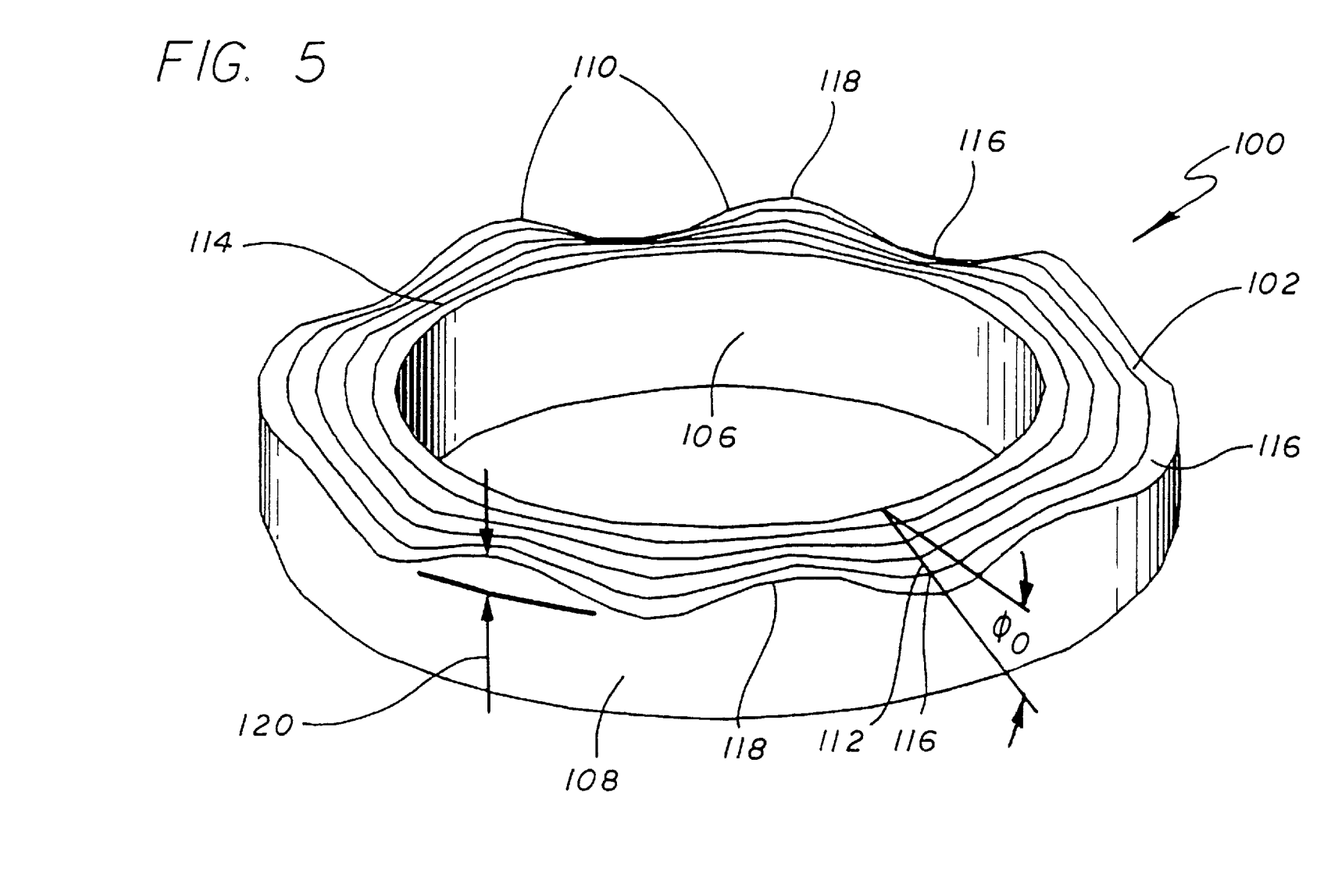
FIG. 5 is a perspective view of the wavy face mechanical seal ring of the invention.

As illustrated in FIG. 5, the seal ring 100 has the same general shape as the seal ring 14 shown in FIG. 2. In particular, the upper surface 102 of the seal ring 100 extends between a cylindrical inner edge surface 106 and a cylindrical outer edge surface 108. The inner edge surface defines a passage through the seal ring to accommodate shafts or other components of mechanisms used in conjunction with the seal ring. The outer edge surface of the seal ring extends perpendicularly downward from the outer circumference of the upper surface of the seal ring. The seal ring is preferably made of relatively hard material, such as tungsten carbide, silicon carbide, ceramic or metal or other materials of suitable strength and wear resistance. Because such hard materials are utilized, this seal ring is commonly referred to as the "hard face" seal ring.

The upper surface, or face, of the seal ring 102 includes numerous circumferential waves 110 that are each separated by a radially-tilted region 112. The inner periphery of the upper surface of the seal ring forms an elevated and generally flat circumferential dam 114. The maximum angle from the horizontal of the radially tilted regions is illustrated in FIG. 5 as angle $\phi_0$. The waves have low spots 116 and high spots 118 that are most apparent at the outer diameter of the seal ring. Each low spot coincides with an associated low spot of the tilted region. The high spots of the waves are generally aligned in height with the dam and thus the amplitude 120 of the waves diminishes to zero as one moves radially inward toward the dam 114.

Figure 6:
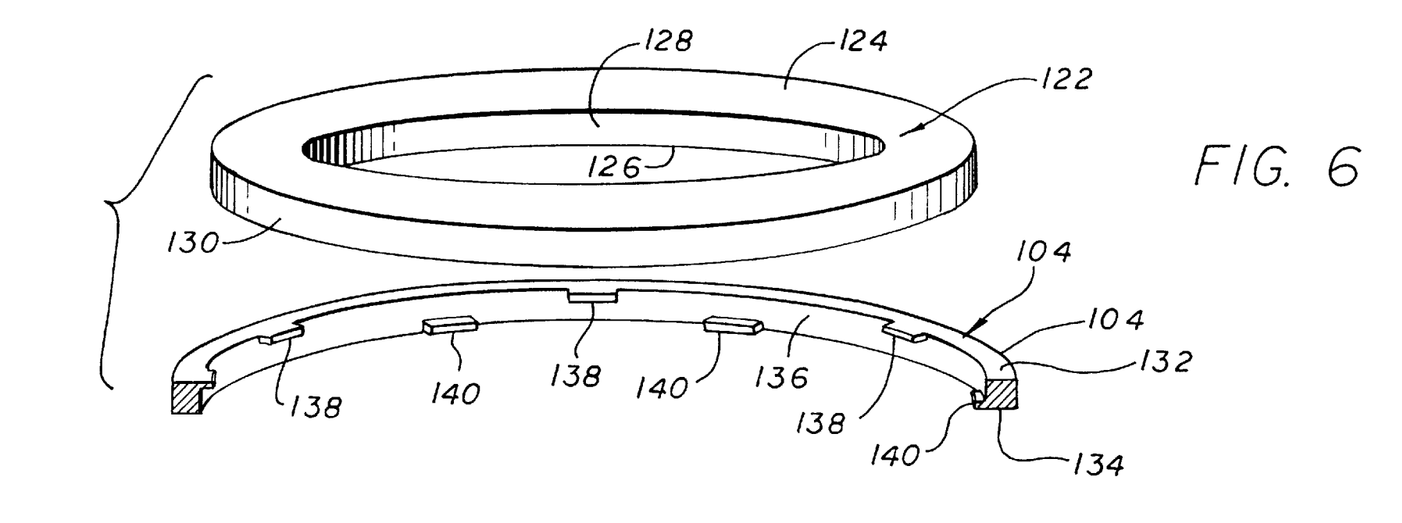
FIG. 6 is a perspective view, in partial cross section, of a shrink band and a seal ring blank used to manufacture the wavy face mechanical seal ring of FIG. 5.
Figure 7:
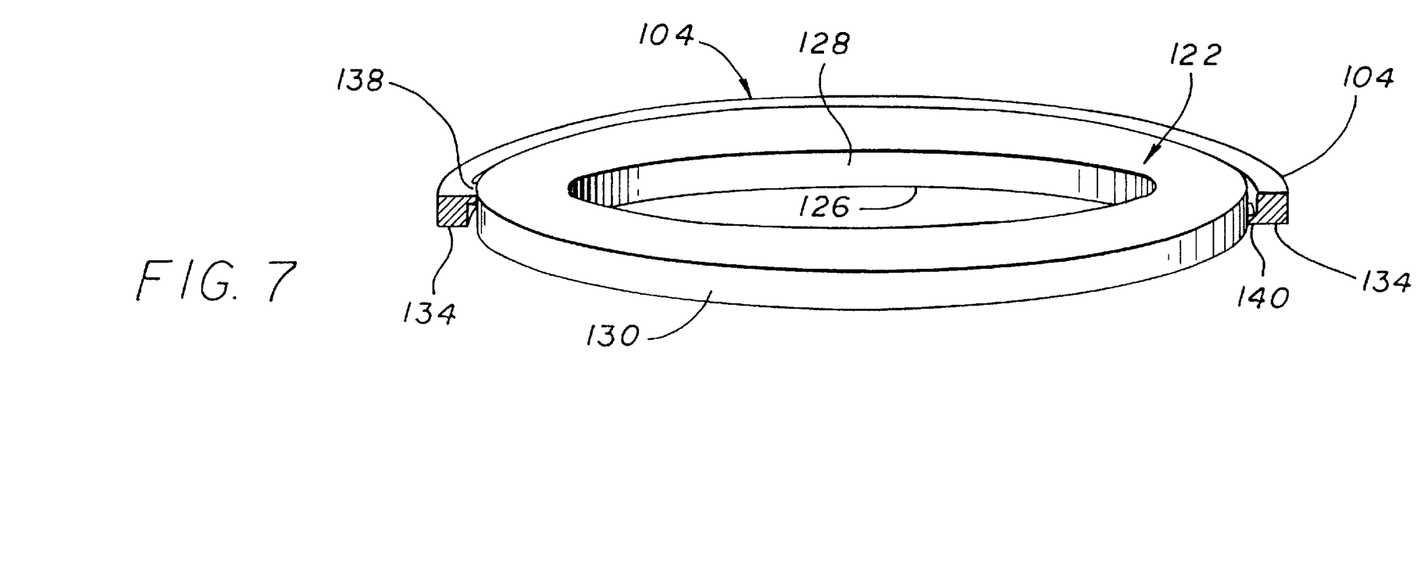
FIG. 7 is a perspective view, in partial cross section, of the shrink band installed upon the seal ring blank of FIG. 6.

Now referring to FIGS. 6 and 7, the preferred apparatus and method of manufacturing the wavy face seal ring 100 will be described. The method is accomplished with a seal ring blank 122, the thermally expandable shrink band 104 and a commonly available lapping machine (not shown). The seal ring blank has a flat upper face surface 124 and a flat lower surface 126, as well as a radially inner peripheral surface 128 and a radially outer peripheral surface 130 that extend between its upper and lower surfaces.

The shrink band 104 is circular and preferably is made from 17-4 PH stainless steel or any other material having a high yield strength. The shrink band has an upper face surface 132, a lower, or rear, surface 134, and a radially inner cylindrical surface 136 with front pads 138 and rear pads 140 that project radially inwardly therefrom. To facilitate formation of the proper wave pattern on the seal ring, the front and rear pads are circumferentially spaced and located in an alternating fashion so that a front pad is adjacent to the upper face surface 132 of the shrink band, then a rear pad is located adjacent to the rear surface 134 of the shrink band, and so forth. The shrink band is axially shorter than the seal ring, i.e., surface 136 is shorter than surface 130 of the seal ring. This difference need be only a few thousandths of an inch. It should be appreciated that, for the sake of clarity, FIGS. 6 and 7 show only a portion of the circular shrink band.

As described in more detail below, the shrink band 104 is expanded by heating and the seal ring blank 122 is placed inside. The shrink band is then cooled so that it contracts and selectively applies compressive force about the outer edge surface of the seal ring blank to cause the upper surface 124 of the seal ring blank to deform into a first wave pattern. Because the seal ring blank extends axially higher than the shrink band, the upper surface 124 protrudes, which exposes it for lapping. The seal ring blank and the attached shrink band are then placed onto a lapping machine for lapping of the now wavy upper surface of the seal ring blank. The upper surface of the seal blank is lapped until it is planar and preferably his a surface roughness of approximately 2 μin $R_a$. After the lapping is completed, the shrink band is expanded by heating to remove it from the seal ring blank. After the shrink band is removed, the lapped flat upper surface of the seal ring blank relaxes and assumes a second wave pattern that generally is the mirror image of the first wave pattern. This second wave pattern on the face surface of the seal ring is the wavy face of the seal 14 shown in FIG. 5. It should be noted that the face surface of the ring blank shown in FIG. 7 is deformed into the first wave pattern, which is a mirror image of the second wave pattern. For the sake of clarity, the first wave pattern is not shown for FIG. 7.

As described above, the aforementioned special method allows the manufacture of wavy face seals that have a surface finish much smoother than conventional wavy face seals. Such smooth wavy face seals advantageously provide improved leakage characteristics and greater load support, especially when used for gas seal applications.

Figures 8, 9A, 9B:
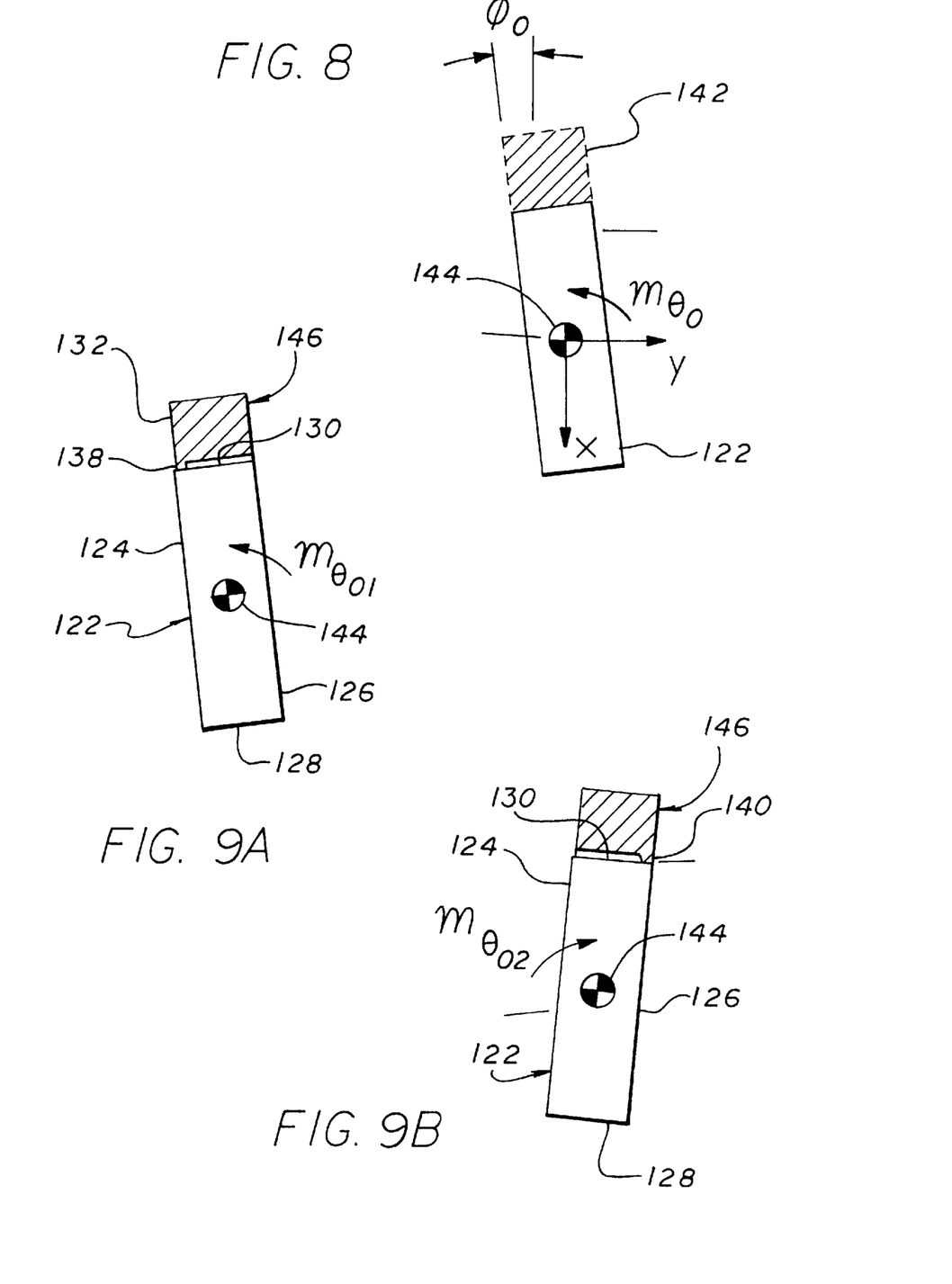
FIG. 8 is a schematic view of a moment produced by a first idealized shrink band on a seal ring blank.
FIGS. 9A and 9B are schematic representations of moments produced by a second idealized shrink band showing the front and rear pads, respectively, contacting the seal ring blank.

Now the theory behind the deformation characteristics of the shrink band 104 and the seal ring blank 122 will be described. In this regard, FIG. 8 illustrates a first idealized shrink band 142 that creates localized moments about the centroid 144 of the cross section of the seal ring blank. The idealized shrink band does not have the aforementioned inwardly projecting front and rear pads 138 and 140. The needed magnitude of a localized moment $m_\Theta$ created about the centroid of the seal ring blank that produces the wanes can be computed by the equation:

$$m_\Theta = \frac{\lfloor \phi_0 E J_x (n^2 - 1)^2 \rfloor}{[r_c^2 (1 + An^2)]}$$

where $m_\Theta$=moment about the centroid of the seal;
$\phi_0$=the maximum tilt of the imposed wave;
E=Young's Modulus;
$J_x$=moment of inertia equivalent for a curved beam;
n=number of waves;
$r_c$=radius to the centroid of the wall of the ring blank; and
A=stiffness ratio.

The stiffness ratio A is described by the following equation:

$$A = \frac{E J_x}{\lfloor G J_\Theta \rfloor}$$

where

G=Modulus of rigidity, and
$J_{73}$=polar moment of inertia.

From the above equations, it is apparent that the moment is a function of the number of waves 110 squared (see FIG. 5). Thus, stress considerations limit the number of waves that can be formed into a ring blank 122 (see FIG. 6). In other words, if the moment required for a particular wave amplitude is held constant, the forces needed to produce increasing numbers of waves of such amplitude would be difficult to apply because the forces required to produce the moment would increase as the square of the number of waves.

The effects of the front pads 138 and the rear pads 140 of a second idealized shrink: band 146 are schematically illustrated in FIGS. 9A and 9B. The front and rear pads of this second idealized shrink band are of equal size and thus, the interference between each of the pads and the outer peripheral surface 130 of the ring blank 122 is equal. When the shrink band is compressed about the seal ring blank 122, the radially inward ends of the pads contact the radially outer peripheral surface 130 of the seal ring blank. To facilitate the formation of a wave-shaped deformation pattern on the ring blank, two counter-rotating moments are required for each wave 110 and, thus the number of pads required is twice the number of the waves to be formed on the ring blank. In this regard, FIG. 9A shows a localized moment $m_{\Theta 1}$ produced by the front pad of the shrink band 146 and FIG. 9B shows a localized moment $m_{\Theta 2}$ produced by the rear pad of the shrink band 146. As will be described below, more interference between the front pads and the outer peripheral surface of the ring blank is desirable to form the preferred wave shape.

Figure 10:
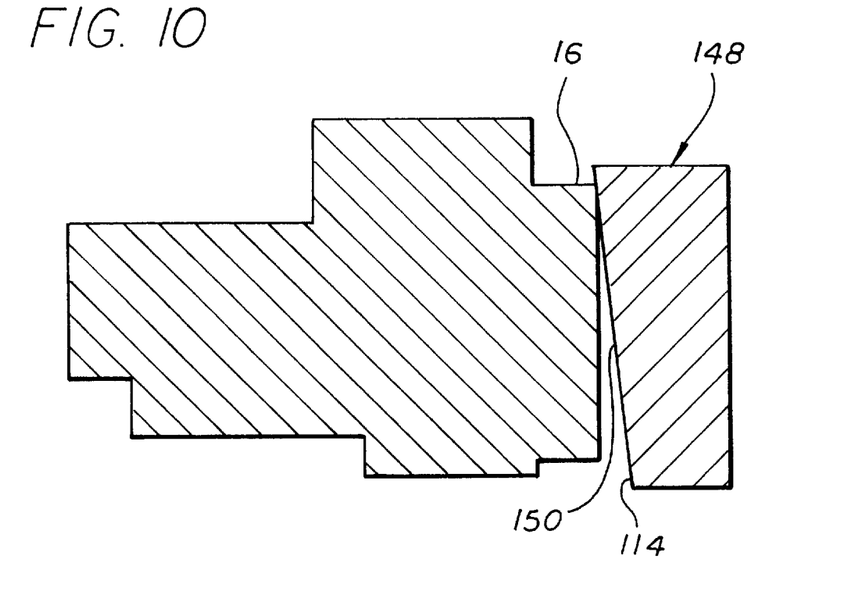
FIG. 10 is a cross section of the primary ring and wavy face seal ring formed according to FIGS. 9A and 9B.
Figure 11:
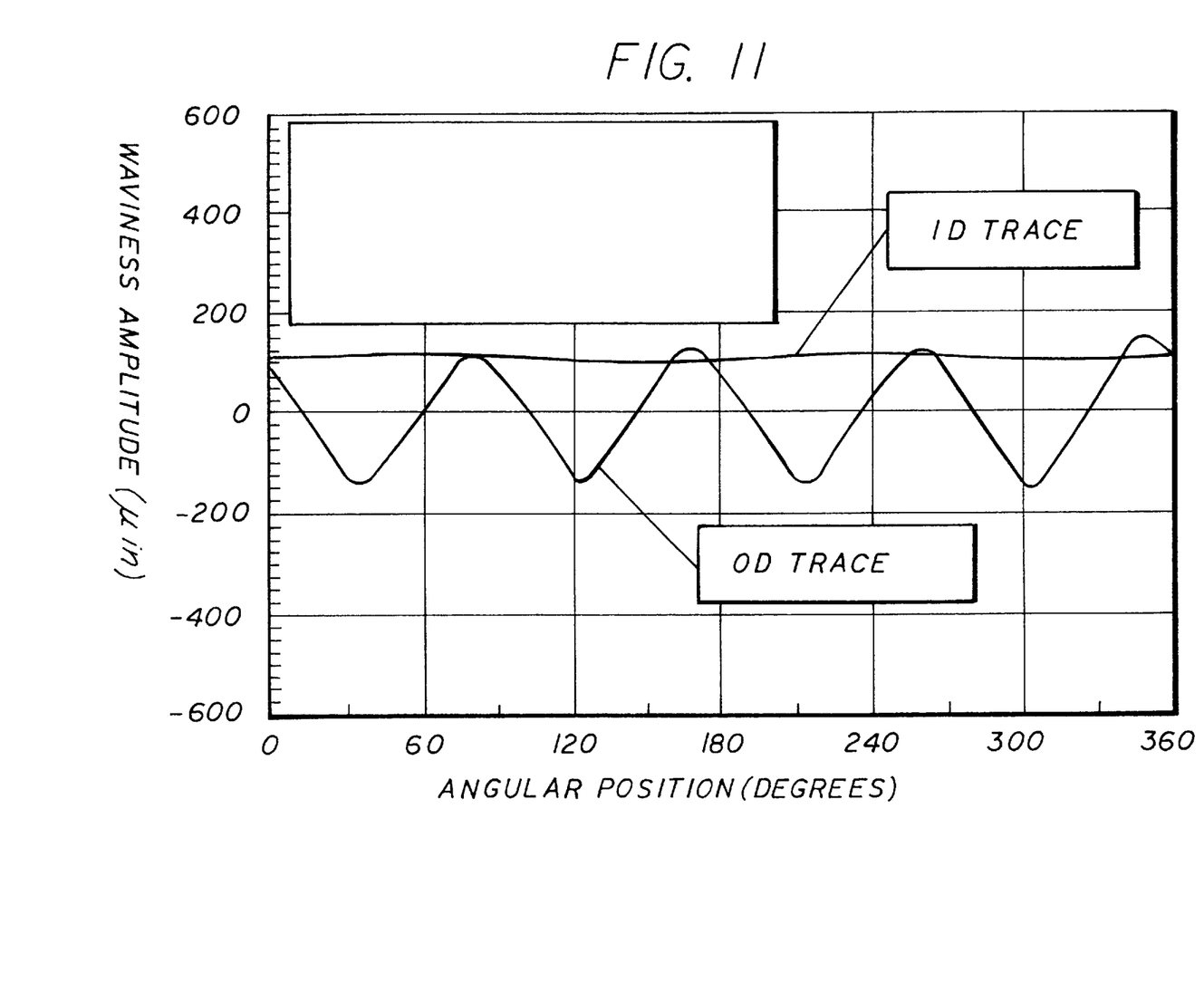
FIG. 11 is a chart showing a circumferential measurement of the height of a wavy-tilt-dam face seal ring near its outer diameter and near the dam at its inner diameter.

FIG. 10 shows a cross section at the wave peak 118 of FIG. 5 of the resulting wavy face seal ring 148 formed by the refined shrink band 146 of FIGS. 9A and 9B. In particular, because the interference between the front and rear shrink band pads 138 and 140 and the outer peripheral surface 130 of the ring blank 122 is equal, the resulting wave peaks 150 are not horizontally aligned with the flat dam 114 located on the inner diameter of the seal. The height of these wave peaks increases toward the outer diameter of the seal ring, where the seal ring would engage the primary ring 16 of a seal mechanism. These wave peaks would be formed if the ring blank is lapped flat and the shrink band 146 is removed to allow the ring blank to assume a mirror image of the wave pattern originally formed by the shrink band. This results in only the outer diameter of the wavy face mating ring contacting the primary ring. Such a configuration is not desirable because significant coning across the face of the mating seal ring 148 will cause the primary ring to wear to a similar coned shape or to a point wherein sufficient hydrodynamic load support can be generated to separate the opposing faces. This is also an undesirable configuration because face damage to the primary ring and the mating ring from the wear-in process may increase the roughness of their surfaces and result in degraded lift. Also, debris created by the wear between the primary and mating rings also contributes to lower film running heights that can result in yet further wear. As described below, this improper configuration can be corrected. In this regard, FIG. 11 shows a circumferential measurement of the correct configuration of a wavy face ring near its outer diameter ("OD Trace") and near the dam at its inner diameter ("ID Trace"). While the outer diameter has a wavy shape, the waves are insignificant at the location of the dam on the inner diameter of the wavy face seal.

Figure 12A:
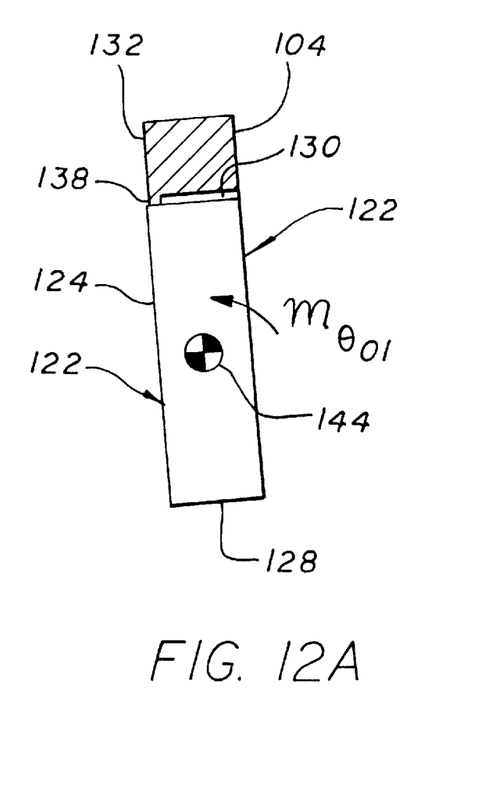
FIGS. 12A and 12B are schematic representations of the shrink band mounted upon the seal ring blank of FIG. 7 showing the front and rear pads, respectively, contacting the seal ring blank.
Figure 12B:
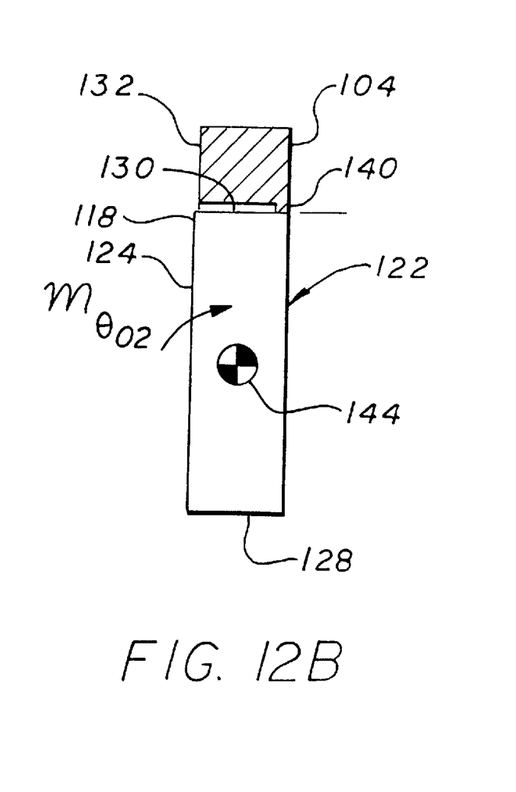

The above problem relating to the height of the wave peaks 118 interfering with the proper operation of the wavy face seal ring 100 is corrected by configuring the shrink band 104 with front pads 138 that are longer than the rear pads 140. In other words, the front pads extend radially inwardly a distance greater than that of the rear pads and thus create more interference with the seal ring blank 122 as compared to the rear pads. FIGS. 12A and 1213 show a schematic representation of the shrink band 104 with the enlarged front pads. What will ultimately become the high spot 118 of the wave is flat (FIG. 12B) where the seal ring blank 122 is distorted by the rear pads 140 of the shrink band 104. Recalling that, after lapping and removal of the shrink band, the high spot of each wave assumes a mirror image of this flat spot, it can be appreciated that the mirror image of a flat spot is similarly flat. Thus, the pad configuration of the preferred shrink band 104 results in wave peaks 118 that are similarly flat or concave or convex within acceptable limits.

Along with producing the desired number of waves 110 on the seal ring blank 122, the process must also provide for the flat, circumferential dam 114 on the finished wavy face seal ring. The dam is formed at the radial location at which the counter-rotating moments described above produce a zero deflection in the axial direction. It is possible that the counter-rotating moments will offset each other at a radial location of less than the inside diameter of the inner edge surface of the ring, which is not a location on the seal ring 100. In other words, the amplitude 120 of the waves under certain circumstances will not reduce to zero at the inner diameter of the seal ring. To calculate the radius of the location where the circumferential dam will be formed, several formulas are analyzed.

The equation for the axial displacement of the ring centroid from its undistorted position is $$v_0 = \frac{[m_\Theta r_c^3 (1+A)]}{[EJ_x(n^2-1)^2]}$$

and the formula for the radius of the dam is:

$$r_d = r_c - v_0/\phi_0$$

where $v_0$=axial displacement of the centroid, and $r_d$=radius to the dam.

By rearranging the above equations with the first equation for moment $m_\Theta$, the following expression for dam radius can be obtained:

$$r_d = r_c - \frac{[(1+A)r_c]}{(1+An^2)}$$

The above equation demonstrates that the number of waves (n) has a strong influence upon the location of the dam 114. Further, because $m_\Theta$ drops out of the equation, the dam location is a function of geometry and not the loading of the seal ring blank 122.

The contact forces from the shrink band 104 can be generally computed from the following equation:

$$p = \frac{\delta}{\left[\frac{b}{E_0}\left(\frac{(c^2+b^2)}{(c^2-b^2)}+\mu_0\right)+\frac{b}{E_i}\left(\frac{(b^2+a^2)}{(b^2-a^2)}-\mu_i\right)\right]}$$

where:

p=contact pressure;

a=inside radius of the seal ring;

b=outside radius of the seal ring;

c=outside radius of the shrink band;

$E_0$=Young's Modulus for the shrink band material;

$E_i$=Young's Modulus for the seal ring material;

$\mu_0$=Poisson's ratio for the shrink band material;

$\mu_i$=Poisson's ratio for the seal ring material; and $\delta$=radial interference.

This equation can be used to adjust the tolerances of the finished wavy face seal ring 100. In particular, the shrink band 104 can be designed to minimize tolerance effects by utilizing a large interference fit for a desired contact pressure. For a given contact pressure, the interference can be increased only if the internal hoop stresses of the shrink band are allowed to increase. This is accomplished by reducing the radial cross section of the shrink band. For example, for a shrink band designed to have a diametral interference of 0.008 inch to produce waves having an amplitude of 300 $\mu$in., a total tolerance of 0.001 inch will result in a deviation in the amplitude of the waves of ±18 $\mu$in. or 12%. From such a design, one would expect excellent repeatability from the manufacturing process.

The range of preferred characteristics of the wavy face seal ring 100 are as follows:

wave amplitude: 50 to 500 $\mu$in.;

tilt at wave peak: 200$\mu$ radians convex to 400$\mu$ radians concave;

dam radius: from inner diameter of the seal ring to 50% of the radial width of the seal ring; and number of waves: 3 to 10.

It should be appreciated that, by using the above equations, an iterative process can be used to match shrink band 104 interference and desired wave amplitude and geometry, to produce a final configuration for the wavy face seal ring. In lieu of the above equations, computer-based finite element analysis also can be performed to assist in the prediction of the required interferences and the resulting deformation patterns produced by specific configurations of shrink bands and ring blanks.

In light of the above description, the preferred method for manufacturing the wavy face seal 100 can be readily understood. The shrink band 104 is expanded by heating it by an oven, induction heater or other suitable devices to a temperature that is preferably between 500 and 700 degrees Fahrenheit. Depending on the thermal expansion characteristics of a particular material of a shrink band used for a particular application, the shrink band can be heated to any temperature less than the temperature which would degrade the shrink band material. The seal ring blank 122 is then placed inside the hot expanded shrink band so that the pads 138 and 140 of the shrink band will contact the outer peripheral surface 130 of the seal ring blank as the shrink band contracts by cooling. As the shrink band cools to room temperature and contracts, the pads selectively apply force to the outer peripheral surface of the seal ring blank to cause the face surface 124 of the seal ring blank to deform into a first wave pattern. The seal ring blank and the attached (and now room-temperature) shrink band are then placed onto a commercially available lapping machine for lapping of the now wavy upper surface of the seal ring blank which protrudes slightly above the shrink band. The upper surface of the seal ring blank is then treated by lapping it until it is planar and preferably has a surface finish of approximately 2 $\mu$in $R_a$. Alternatively, the upper surface of the seal ring blank can be lapped until the face shows a flat condition as visible with an optical flat or it can be ground with a surface grinder. Other processes resulting in similar surface finishes may be utilized as required by a particular application. After the lapping is completed, the shrink band is rapidly heated to expand it and separate it from the seal ring. After the shrink band is removed from the seal ring 100, the lapped flat face surface of the seal ring relaxes and assumes a second wave pattern that generally is the mirror image of the first wave pattern. This second wave pattern on the upper face of the seal ring is the wavy face seal ring 100 of FIG. 5. As described by the above equations, the number of pads and the geometry of the seal ring are selected such that the upper face of the finished seal ring remains flat and forms a circumferential dam 114.

It should be appreciated that, according to the requirements of particular applications, including liquid seal applications, instead of heating the shrink band 104, the seal ring blank 122 could be contracted by cooling, then placed within the band and expanded by heating. Further, a cooled shrink band could be placed within the hole defined by the inner cylindrical surface 128 of the seal ring blank. As the temperature of the shrink band is increased, it would expand and apply force to the inside surface of the seal ring blank to create a deformation pattern. It should be noted that the placement of the shrink band on the inside edge of the seal ring blank would only be effective if the seal ring blank was made of a material having tensile strength characteristics sufficient for withstanding the tensile stresses applied by the expanding shrink band.

Figure 13:
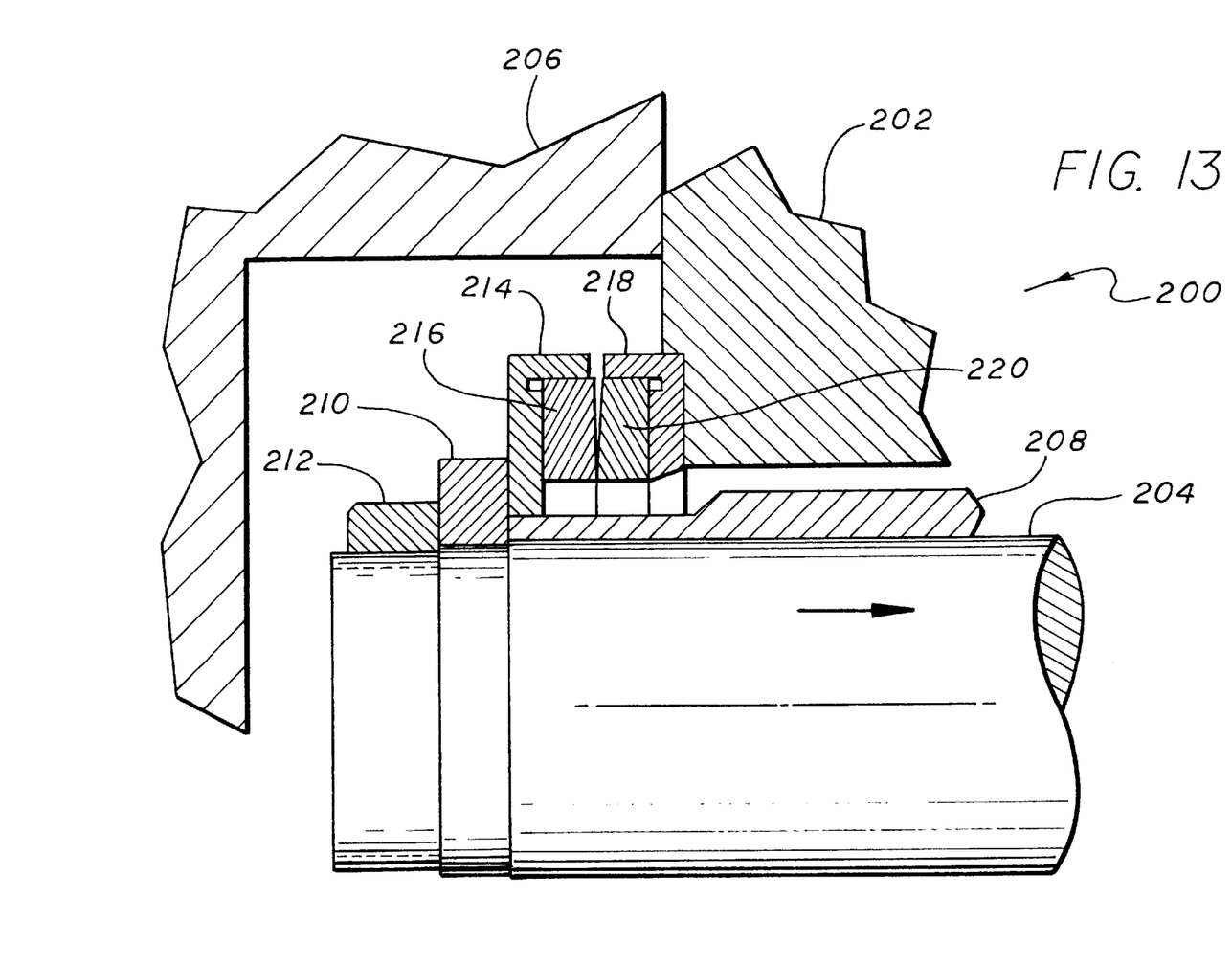
FIG. 13 is a cross sectional assembly view of a portion of a pump having a thrust bearing according to the invention.

Another application for a wavy-tilt-darn ring is in connection with a thrust bearing assembly 200 shown in FIG. 13. The thrust bearing assembly 200 is mounted in a housing 202, e.g. a pump housing, having a shaft 204 therein. A cover plate 206 closes off the end of the housing. Preferably, a shaft sleeve 208 is fixed to the shaft. The shaft sleeve abuts a washer 210 that is located by a threaded nut 212 on the shaft. The thrust bearing assembly includes a rotary ring holder 214 and its associated rotary thrust ring 216 and a stationary, ring holder 218 and its associated stationary thrust ring 220. The rotary ring holder may be keyed or otherwise connected to the shaft and the stationary holder may be keyed or otherwise connected to the housing.

The thrust rings are preferably mounted to their respective holders by positioning pins, similar to the positioning pin described in connection with the wavy face seal ring shown in FIG. 5. In the preferred embodiment, the stationary thrust ring has a wavy-tilt-dam configuration, although the wavy-tilt-dam could also be used on the rotary thrust ring. In addition, like the wavy face seal ring, the wavy face thrust ring is preferably made of relatively hard material, such as tungsten carbide, silicon carbide, ceramic or metal or other materials of suitable strength and wear resistance.

In operation, during rotation of the shaft, the waves on the stationary thrust ring form converging regions that compress the fluid between the faces of the rotary and stationary thrust rings. Compression of the fluid develops hydrodynamic load support which lifts the faces apart, thereby reducing friction. The dam on the stationary thrust ring increases load support by reducing the amount of fluid discharged from between the faces.

While a particular form of the invention has been illustrated and described, it will be apparent that various modifications can be made without departing from the spirit and scope of the invention. Accordingly, it is not intended that the invention be limited, except as by the appended claims.

I claim:

1. A method of manufacturing a wavy face ring, comprising:
    providing a ring blank having a face surface and a peripheral surface;
    applying a predetermined force to the peripheral surface of the ring blank to deform the face surface of the ring blank into a first wave pattern;
    treating the face surface of the ring blank while the force is being applied to the peripheral surface of the ring blank to obtain a predetermined treatment of the face surface; and
    removing the force from the peripheral surface of the ring blank such that the face surface of the ring blank relaxes and assumes a second wave pattern.

2. The method as defined in claim 1, wherein the first wave pattern is generally a mirror image of the second wave pattern.

3. The method as defined in claim 1, wherein the treating includes lapping or surface grinding the face surface of the ring blank.

4. The method as defined in claim 3, wherein the treating continues until the face surface of the ring blank is planar.

5. The method as defined in claim 1, wherein applying a predetermined force to the peripheral surface of the ring blank includes:
    providing a rigid band of a predetermined size;
    creating a temperature-induced size differential between the band and the ring blank;
    positioning the peripheral surface of the ring blank for engagement with the band while maintaining the temperature-induced size differential;
    decreasing the temperature-induced size differential between the band and the ring blank to cause contact between the band and the peripheral surface of the ring blank to apply the predetermined force to the peripheral surface of the ring blank.

6. The method as defined in claim 5, wherein the band includes a face surface, a rear surface and a cylindrical inner surface defining a throughhole of a predetermined diameter extending between the face and rear surfaces, and the band further comprises a plurality of pads projecting radially inwardly from the inner surface of the band for engagement with the peripheral surface of the ring blank and the face surface of the band is closer to the face surface of the ring blank than the rear surface of the band.

7. The method as defined in claim 6, wherein the cylindrical inner surface of the band includes two circumferentially spaced pads located adjacent to the face surface of the band and two circumferentially spaced pads located adjacent to the rear surface of the band.

8. The method as defined in claim 7, wherein the pads located closest to the face surface of the band project radially inward a distance greater than that of the other pads.

9. The method as defined in claim 5, wherein creating the temperature-induced size differential between the band and the ring blank includes heating the band until its circumferential size is greater than that of the circumferential size of the ring blank to permit positioning of the peripheral surface of the ring blank inside the band.

10. The method as defined in claim 1 wherein the second wave pattern is that of a wavy-tilt-dam seal ring.

11. The method as defined in claim 1, wherein the force applied to the peripheral surface of the ring blank is applied to at least two predetermined locations that are longitudinally spaced upon the peripheral surface of the ring blank.

12. A method of manufacturing a wavy face ring, comprising:
    providing a ring blank having a face surface and a peripheral surface located on the circumference of the ring;
    providing a rigid band of a predetermined size;
    creating a predetermined temperature-induced size differential between the band and the ring blank;
    positioning the peripheral surface of the ring blank for engagement with the band while maintaining the temperature-induced size differential;
    decreasing the temperature-induced size differential between the band and the ring blank to cause contact between the band and the peripheral surface of the ring blank to apply a force to the peripheral surface of the ring blank to deform the face surface of the ring blank into a first wave shape;

removing a predetermined amount of material from the face surface of the ring blank while the force is being applied to the peripheral surface of the ring blank;

removing the band from the peripheral surface of the ring blank to allow the face surface of the ring blank to relax and assume a second wave shape.

13. The method as defined in claim 12, wherein the removing a predetermined amount of material from the face surface of the ring blank includes lapping or surface grinding.

14. The method as defined in claim 13, wherein removing the band causes the ring blank to assume a second wave shape and wherein removing a predetermined amount of material from the face surface of the ring blank continues until the face surface of the ring blank is planar.

15. The method as defined in claim 12, wherein the band includes a face surface, a rear surface and a cylindrical inner surface defining a throughhole of a predetermined diameter extending between the face and rear surfaces, and the band further comprises a plurality of pads projecting radially inwardly from the inner surface of the band for engagement with the peripheral surface of the ring blank and the face surface of the band is closer to the face surface of the ring blank than the rear surface of the band.

16. The method as defined in claim 15, wherein the cylindrical inner surface of the band includes two circumferentially spaced pads located adjacent to the face surface of the band and two circumferentially spaced pads located adjacent to the rear surface of the band.

17. The method as defined in claim 16, wherein the pads located closest to the face surface of the band project radially inward a distance greater than that of the other pads.

18. The method as defined in claim 12, wherein creating the temperature-induced size differential between the band and the ring blank includes heating the band until its circumferential size is greater than that of the circumferential size of the ring blank.

19. The method as defined in claim 12, wherein the second wave shape is that of a wavy-tilt-dam seal.

20. The method as defined in claim 12, wherein the force applied to the peripheral surface of the ring blank is applied to at least two predetermined locations that are longitudinally spaced upon the peripheral surface of the ring blank.

21. The method as defined in claim 12, wherein the second wave shape is generally a mirror image of the first wave shape.

* * * * *